US006227553B1

(12) United States Patent
Palmer

(10) Patent No.: US 6,227,553 B1
(45) Date of Patent: May 8, 2001

(54) ATTACHMENT ASSEMBLY FOR USE ON FLAT ROOFS

(76) Inventor: Theodore R. Palmer, 10 Pinelands Avenue, Unit #5, Stoney Creek, Ontario (CA), L8E 3A5

( * ) Notice: Subject to any disclaimer, the term of this patent is extended or adjusted under 35 U.S.C. 154(b) by 0 days.

(21) Appl. No.: 09/520,982

(22) Filed: Mar. 8, 2000

(51) Int. Cl.[7] .............................. B62B 1/00; B62D 21/14; B60S 9/00; E04G 3/16; B65G 9/00

(52) U.S. Cl. .................................... 280/47.18; 280/47.24; 280/43.12; 280/43.14; 280/47.2; 280/47.19; 280/759; 414/673; 182/13; 182/16

(58) Field of Search ............................... 280/43.1, 47.24, 280/43.12, 43.14, 43.2, 47.18, 47.2, 47.19, 759, 62; 410/101, 102; 414/673; 182/10, 11, 107, 108, 109, 12, 13, 16

(56) References Cited

U.S. PATENT DOCUMENTS

| | | | | |
|---|---|---|---|---|
| 2,707,585 | * | 5/1955 | Hoey | 182/16 |
| 3,003,579 | * | 10/1961 | Weiss | 182/13 |
| 4,174,021 | * | 11/1979 | Barlock | 182/17 |
| 4,213,624 | * | 7/1980 | Sanders | 280/43.12 |
| 4,274,507 | * | 6/1981 | Williams | 182/12 |
| 4,496,027 | * | 1/1985 | Fisher | 182/142 |
| 4,799,840 | * | 1/1989 | Van Gompel et al. | 410/42 |
| 4,801,228 | * | 1/1989 | Van Gompel | 410/94 |
| 4,817,758 | * | 4/1989 | Gilmore | 182/16 |
| 5,065,838 | * | 11/1991 | Finley | 182/38 |
| 5,135,078 | * | 8/1992 | Bell et al. | 182/142 |
| 5,328,192 | * | 7/1994 | Thompson | 280/47.24 |
| 5,337,856 | * | 8/1994 | Fillers | 182/107 |
| 5,370,203 | * | 12/1994 | Kiska | 182/109 |
| 5,476,282 | * | 12/1995 | Dahl | 280/47.18 |
| 5,820,143 | * | 10/1998 | Rigo | 280/47.19 |

* cited by examiner

*Primary Examiner*—Brian L. Johnson
*Assistant Examiner*—Joselynn Y. Sliteris
(74) *Attorney, Agent, or Firm*—Stanley J. Rogers

(57) ABSTRACT

An attachment assembly provides a secure attachment point for the fall arrest tether lines of safety harnesses of workers on flat roofs, the assembly being movable over the roof as required. The assembly can be used alone, but usually is mounted on a wheeled utility cart as employed by roofers to move materials on the roof, or may be an integral part of such a cart. The assembly has a base frame that is spaced from the roof edge over which the worker may fall. An attachment member for tether lines is mounted on the base frame together with at least two longitudinally spaced surface engaging arm, the arms being located at the frame side nearer to the roof edge. When the assembly is in operative position each arm has its lower end, which usually has teeth, close to the roof surface. A counterweight is mounted on the opposite side of the base frame. Upon a fall from the roof the tether line pulls on the attachment member downward and toward the edge, the pull tilting the base and cart frames to engage the teeth with the roof surface, whereupon the ends become pivots about which the frames can pivot against the counterweight, which ensures only minor tilting and/or dragging of the assembly toward the edge. With e.g. concrete roofs the teeth may be replaced by bolts in the surface against which the arm ends butt for the assembly to pivot.

24 Claims, 3 Drawing Sheets

ATTACHMENT ASSEMBLY FOR USE ON FLAT ROOFS

FIELD OF THE INVENTION

This invention provides an attachment assembly adapted for use by roofers during installation or repair on a flat roof, or an equivalent roof-like surface of a structure, the assembly providing, for example, for the attachment thereto of a safety harness or harnesses as worn by a person or persons respectively working on the roof The assembly may be used alone, or may be adapted for mounting on a wheeled utility cart such as is commonly used by roofers to move materials on the roof surface, or may be provided as an integral part of such a cart.

REVIEW OF THE PRIOR ART

It is an increasing requirement when persons work on high above ground roof or roof-like surfaces of various structures, for example for the purpose of installation, maintenance and repair, to provide against the possibility of accidental falls to the ground below. Since a fall of quite a short distance can cause serious injury, or even death, the provision of such safety means is desirable when the height of the surface above the ground is as small as about 2 meters (6 feet), and some jurisdictions now require a safety installation of some kind for all work above this height. One type of structure with which such a safety installation is particularly necessary is a flat building roof, since these are always well above the minimum height and usually have only a low parapet rising to about knee-height extending around the outside edge, such a parapet usually also having a number of breaks and gaps around its perimeter. Other instances in which some provision must be made for safety on a roof surface is when skylights are being installed or repaired, or when an entire section of roof has been removed to replace the underlying roofing beams and rafters, both examples involving the creation of a dangerous open space on the roof. Yet another instance are the open floors of a multi-storey building before the outside curtain walls have been installed. One safety arrangement consists of guard rails that are attached to the structure so as to surround the area in which the operatives are working, and are preferred if possible since the operatives can move freely over the area, but they are relatively expensive and usually can only be justified economically when the area is large and/or the work will take an extended period of time to complete. A less expensive installation comprises a safety harness worn by each worker that is releasably attached by a tether line and snap hook or shackle to a secure attachment point on the structure. Such a secure point or points must of course be strong enough to withstand the forces applied thereto by a falling body, or in a worst case scenario to withstand the forces applied thereto if all of the workers attached thereto fall simultaneously from the roof. It is usually extremely difficult to find existing attachment points that are suitable, especially on structures that were built before such a requirement was envisaged, and there is therefore the need for an assembly providing such a point that can readily be brought to the structure as and when required, and preferably also readily removed when the job is finished so that it can be used elsewhere.

A particular problem with flat roofs, or their equivalents, of any substantial size follows from the need to use tether lines that are long enough not to obstruct free movement over a usefully large enough area of the surface, while short enough to ensure that a falling body does not reach the ground. With a large roof this either involves providing a number of suitably spaced and located attachment points, or providing some means of moving the attachment point or points that are provided as the workers move over the roof surface. A standard piece of equipment for a roofer when operating on a flat roof is a so-called utility cart, which is a three or four wheeled cart (the third wheel, or one pair of the wheels, trailing and pivoting for steering purposes) which is small enough to be hoisted on to the roof by the usual temporary hoist or elevator, and which is then used to move supplies of roofing felt, asphalt, gravel, etc. over the roof. Such a utility cart is itself much too light to serve as an attachment point and, in view of the surprisingly high forces likely to be encountered in the worst case scenario of, say, three workers each weighing as much as 100 Kg (220 lbs) falling together from the roof surface, it becomes difficult if not impossible to load the cart sufficiently with dead weight, since this could require as much as about one metric ton, an amount which such utility carts are not usually designed to carry.

SUMMARY OF THE INVENTION

It is a principal object of the invention therefore to provide an attachment assembly structure usable as a free-standing structure on a flat roof surface and providing, for example, a secure attachment point for at least one, and preferably for as many as three safety harnesses, but which nevertheless can be moved about the roof relatively easily as required to permit the workers to work on different parts of the roof.

It is another object to provide an attachment assembly structure adapted for ready attachment to a wheeled utility cart as and when required, and when so attached providing a secure attachment point for, for example, at least one, and preferably as many as three safety harnesses, and which can nevertheless can be moved about the roof as required on the cart.

It is a further object to provide such an attachment assembly as an integral part of a wheeled utility cart structure of size such that it can readily be hoisted on to a roof and function as a secure attachment point for, for example, one or more safety harnesses.

In accordance with the invention there is provided an attachment assembly for use on a horizontal surface, the assembly when mounted on such a surface providing an attachment point for at least one safety harness permitting movement of a worker wearing the harness on the surface, the attachment assembly comprising:

- an assembly base frame having a first side which in operation faces toward a surface edge over which a worker may fall, and a second opposite side facing away from that surface edge;
- at least two surface engaging members mounted on the base frame at or adjacent to the first side and spaced longitudinally from one another along that first side, each surface engaging member having an upper and a lower end and each being attached to the base frame so that when the assembly is in position on a surface the respective lower end is in an operative position contacting or in close proximity to the surface between the first side and the surface edge; and
- an attachment member carried by the base frame and providing an attachment point between the at least two surface engaging members;
- a counterweight providing a counterweight moment and mounted on the assembly base frame so as to be disposed at the base frame second side;

whereby the application of a tension force to the attachment member in a direction having a component toward the surface edge urges the base frame to tilt toward the first side and thereby positively engage the surface engaging members lower ends with the surface, whereupon the thus engaged lower ends become pivots about which the base frame is urged by the tension force to pivot and thereby urge the counterweight upward away from the surface against its downward acting counterweight moment.

Also in accordance with the invention there is provided an attachment assembly for use on a horizontal surface, the assembly being adapted for attachment to a wheeled utility cart movable over the horizontal surface, the cart having a cart frame which has a first side thereof which in operation faces toward a surface edge over which a worker may fall, and a second opposite side facing away from that surface edge, and the assembly when so attached to the cart providing an attachment point for at least one safety harness tether line permitting movement of a worker wearing the harness on the surface, the attachment assembly comprising:

a base frame adapted for attachment to the cart frame and also having a first side thereof which in operation faces toward the surface edge over which a worker may fall, and a second opposite side facing away from that surface edge, the base frame being attachable to the cart frame so that their first edges and their second edges respectively are adjacent to one another;

at least two surface engaging members mounted on the base frame at or adjacent to its first side and spaced longitudinally from one another along the base frame first side, each surface engaging member having an upper and a lower end and each being attached to the base frame so that when the assembly is in position on a surface the respective lower end is in an operative position contacting or in close proximity to the surface between the base and cart frame first sides and the surface edge;

an attachment member carried by the base frame and providing an attachment point between the at least two surface engaging members; and a counterweight structure providing a counterweight moment and mounted on the assembly base frame so as to be disposed at the base and cart frames second sides;

whereby the application of a tension force by a safety harness tether line to the attachment member in a direction having a component toward the surface edge urges the base and cart frames to tilt toward their first sides and thereby positively engage the surface engaging members lower ends with the surface, whereupon the thus engaged lower ends become pivots about which the base and cart frames are urged by the tension force to pivot and thereby urge the counterweight upward away from the surface against its downward acting counterweight moment.

Further in accordance with the invention there is provided an attachment assembly and wheeled utility cart combination for use on a horizontal surface and adapted for movement over the surface, the combination having a base frame which in operation has a first side which faces toward a surface edge over which a worker may fall, and a second opposite side facing away from that surface edge, the base frame providing an attachment point for at least one safety harness tether line permitting movement of a worker wearing the harness on the surface, the combination comprising:

at least three wheels rotatably mounted by the base frame and on which the combination is movable over the surface;

at least two surface engaging members mounted on the base frame at or adjacent to its first side and spaced longitudinally from one another along the base frame first side, each surface engaging member having an upper and a lower end and each being attached to the base frame so that when the assembly is in position on a surface the respective lower end is in an operative position contacting or in close proximity to the surface between the base frame first side and the surface edge;

an attachment member carried by the base frame and providing an attachment point between the at least two surface engaging members; and a counterweight structure providing a counterweight moment and mounted on the base frame so as to be disposed at the base frame second side;

whereby the application of a tension force to the attachment member in a direction having a component toward the surface edge urges the base frame to tilt toward its first side and thereby positively engage the surface engaging members lower ends with the surface, whereupon the thus engaged lower ends become pivots about which the base frame is urged by the tension force to pivot and thereby urge the counterweight upward away from the surface against its downward acting counterweight moment.

DESCRIPTION OF THE DRAWINGS

An attachment assembly, a combined attachment assembly and utility cart, and an integral combination of an attachment assembly and utility cart, that are particular preferred embodiments of the invention will now be described, by way of example, with reference to the accompanying diagrammatic drawings, wherein.

DESCRIPTION OF THE PREFERRED EMBODIMENTS

Figure 2:
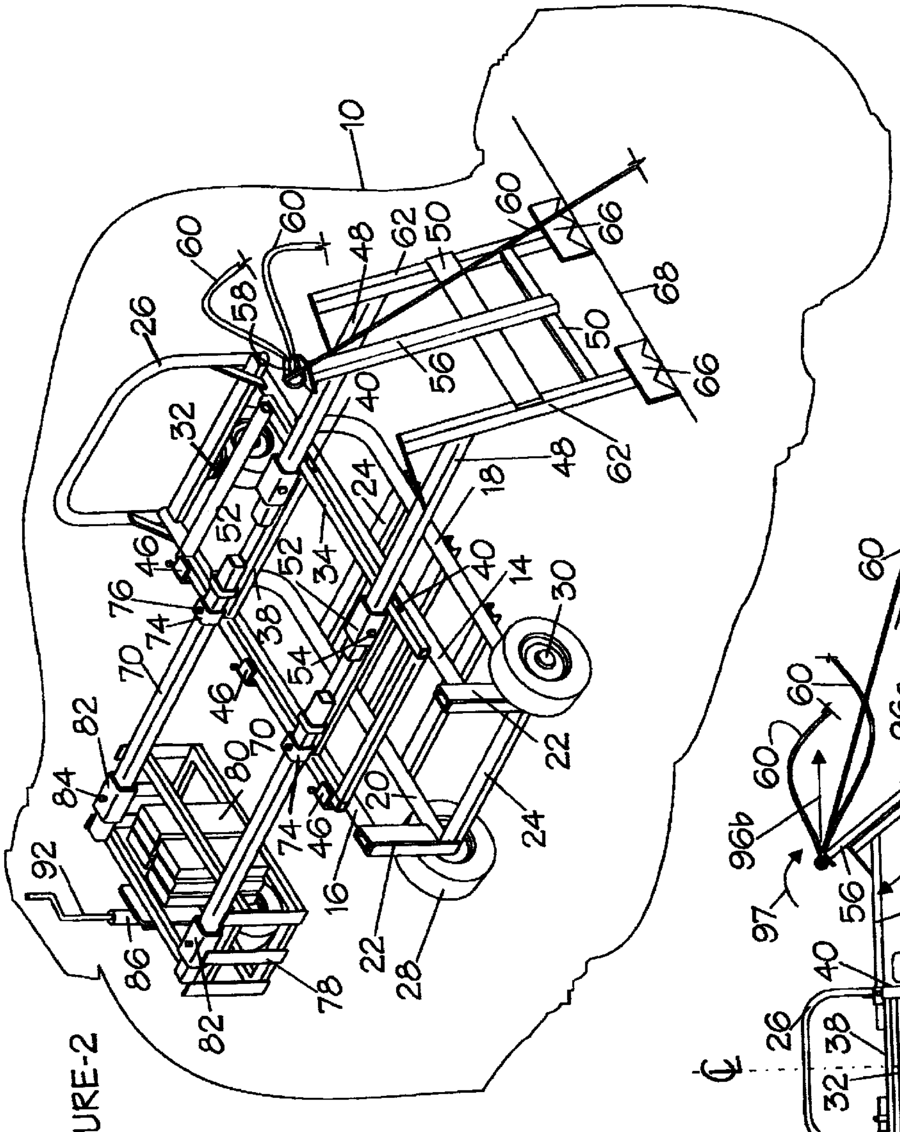
FIG. 2 is a perspective view partially from one side, from one end, and from above of the combined attachment assembly and cart of FIG. 1.

The attachment assembly that is a first embodiment of the invention is especially adapted for attachment as and when required to a standard wheeled utility cart of the type commonly used by roofers for carrying roofing materials when working on a flat horizontal surface, such as roof surface 10 having an edge 12 over which persons working on the surface can fall, and when so attached acting as a secure attachment point for up to three fall arrest safety harnesses worn by those persons. Such a cart usually comprises a cart frame that is rectangular as seen in plan, and approximately rectangular as seen in side elevation, the frame being formed by two parallel longitudinal upper side members 14 and 16, and two longitudinal lower side members 18 and 20. The lower members curve upward to connect at their rear ends directly with their respective adjacent upper members, as by being welded thereto, while the front ends of the two pairs of side members 14,18 and 16,20 are connected together by uprights 22. The two parallel generally rectangular cart side frames thus formed are connected together by a plurality of transverse cross members 24. A vertically extending U-shaped operator's handle 26 is provided at the rear end and the cart runs on three rubber tire wheels 28, the two wheels at the front end being rotatably mounted on a fixed transversely extending axle 30, while the single rear wheel is centrally mounted by a pivot bearing 32 so that it trails and pivots to facilitate steering. Another version of the cart that is not illustrated employs four wheels with the two at the rear trailing and pivoting for steering. A standard size for such a cart is 1.5–2.1 meters (5–7 feet) in length, 70–90 cm (28–36 ins) in width, and 30–50 Kg (60–100 lbs) in weight, so that it can readily be hoisted on to the roof, either by a rope and pulley or by a light-weight temporary conveyor or hoist when that is employed, usually when the job is sufficiently large. In an operative position, when used in combination with an attachment assembly of the invention, the cart is disposed on the roof with its side frame 14,18 parallel to and spaced an appropriate distance, e.g. about 5 meters (15 feet) from the roof edge 12. The actual spacing required will of course vary with the location of the edge to be guarded, and may also be varied in dependence upon the length of the harness tether line to ensure that the falling operator will not contact the ground. For convenience in reference, particularly in the accompanying claims, the cart frame side facing toward the roof edge (the one with the side member 14) is designated the first side, while the opposite frame side (including side member 16) facing away from the roof edge is designated the second side. Although the invention is disclosed as in use on a flat roof surface there are other equivalent horizontal surfaces on which it could be used, as described above, for example an intermediate floor of a multi-story building which for some reason has not been provided with the usual edge safety barrier, or with which the barrier provided is ineffective and must be removed and/or replaced.

The attachment assembly itself, when so mounted on and attached to the cart, comprises an assembly base frame that is also rectangular as seen in plan, comprising two parallel longitudinal frame members 34 and 36 that are parallel to and lie on respective longitudinal cart frame members 14 and 16. The member 34 constitutes a first side of the base frame which in operative position is also parallel to and faces toward the edge 12, while the opposite member 36 constitutes a second side facing away from the edge 12. The two side members are connected together by a plurality of longitudinally spaced transverse cross members 38. In this embodiment the assembly and cart frames are of about the same width, and the adjacent longitudinal side members 16 and 36 of the two frames are clamped together by clamps 46. In the event that the assembly frame is somewhat wider than the cart frame (it will not usually be narrower) the clamps 46 can be applied between the side member 16 and the available transverse cross members 38, and at least between the side member 16 and the two endmost cross members 38.

A separate easily mountable and removable surface engaging member sub-frame that in operation is mounted on the assembly base frame comprises two longitudinally spaced parallel support arms 48 mounted with their inner ends slidable freely and with some play within respective tubular sleeves 52 provided with respective retainer bolts 54, the sleeves being securely fastened, as by welding, to assembly frame cross members 38. In this embodiment each support arm 48 is connected to the assembly base frame member 34 by a respective hinge 40, the two hinges therefore being correspondingly longitudinally spaced from one another. Each hinge has a first part attached to the assembly frame first side and a second part attached to the underside of the respective support arm 48, and is provided with a removable hinge pin 42, the pins lying on a longitudinal pivot axis 44 that extends parallel to the assembly and cart frame first sides and about which the support arms can pivot relative to the assembly frame, the relatively small amount of such pivoting that is permitted being determined by the looseness of the engagement of the arms in the sleeves 52. The sub-frame is removed for storage and transport of the assembly to and from the job by removing the hinge pins 42 and the retainer bolts 54. The sub-frame also comprises two longitudinally spaced downward and outward extending parallel surface engaging members 62 which are fastened adjacent their upper ends to respective support arm members 48 so as to be inclined at an obtuse angle 64 to the respective support arm member, and at the same angle to the part of the surface 10 between itself and the roof edge 12. The two downward extending members 62 are connected together by cross members 50 and an upward extending mast 56 is securely fastened to the two cross members 50 so as to be disposed between the members 62, the mast thereby being disposed at a predetermined distance from the assembly and cart frame first sides toward the roof edge 12. The mast is also of predetermined length to extend a correspondingly predetermined height above the assembly frame. The mast upper end is provided with a ring bolt 58 that constitutes an attachment point to which at least one safety harness tether line 60 (three are shown) can be attached, so that the corresponding number of workers on the roof can be attached to the assembly. Each roof engaging member terminates at its lower end in a plate member 66, the lower edge of which is provided with a plurality of downward extending teeth that, under the action of a pull on any one or more of the tether lines 60, will dig into the surface along a line 68 parallel to roof edge 12, as is described in more detail below.

A counterweight sub-frame is also mounted on the assembly base frame and is disposed at the second sides of the base and cart frames. This sub-frame also comprises two longitudinally spaced parallel support arm members 70 which are connected together adjacent their outer ends by a cross member 72 and are slidable freely back and forth in the directions of the arrows 73 within tubular sleeves 74 which are securely fastened, as by welding, to assembly frame side member 36 and cross members 38. The sub-frame is also removed for storage and transport and is held in place by clamp bolts 76 in the sleeves 74. A counterweight basket 78 which receives a required number of separate weights 80 is removably mounted on the outer ends of the arm members 70, the basket having tubular sleeves 82 which slide on the arm members 70 and are held in place by clamp bolts 84. The sleeves 74 and 82 are a much closer fit on the counterweight support arms 70 than are the sleeves 52 on the arms 48, being just enough to ensure easy sliding relative movements. The separate weights can be those usually employed by roofers as anchor weights for a roof hoist, when provided, and make it convenient to load the cart after it has been placed in position on the roof surface. The moment provided by the counterweight basket and its contents is of course determined both by the total weight of the weights 80 and the distance of the center of gravity of the counterweight from the line 68, and with the embodiment as described both of these are readily adjustable as required for the number of tether lines attached to the ring bolt 58. The basket has attached to its outer side a vertically operating jack 86 carrying at the lower end of its vertically movable jack member a single wheel 88, the jack being extensible and contractible to respectively raise and lower the basket in the directions of the arrows 90 by rotation of operating handle 92.

Figure 1:
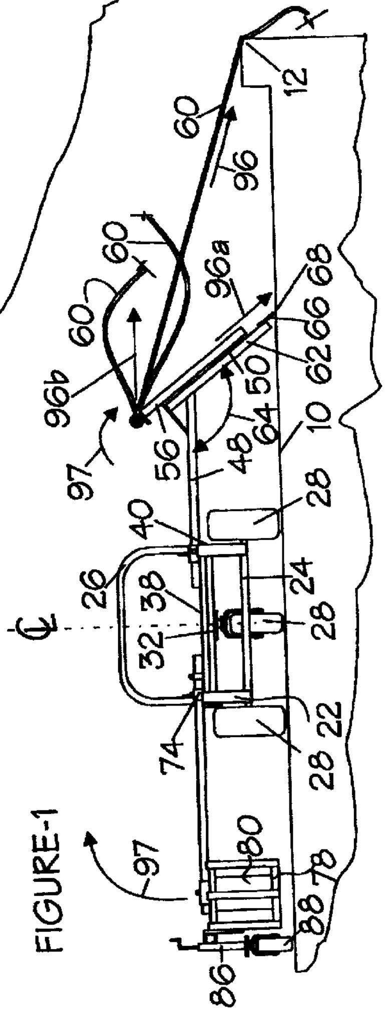
FIG. 1 is an end elevation showing a combined attachment assembly and a standard wheeled utility cart mounted on a flat roof in operative position close to the roof edge and illustrating its function in the event that a worker tethered thereto by a safety line falls over the roof edge.
Figure 3:
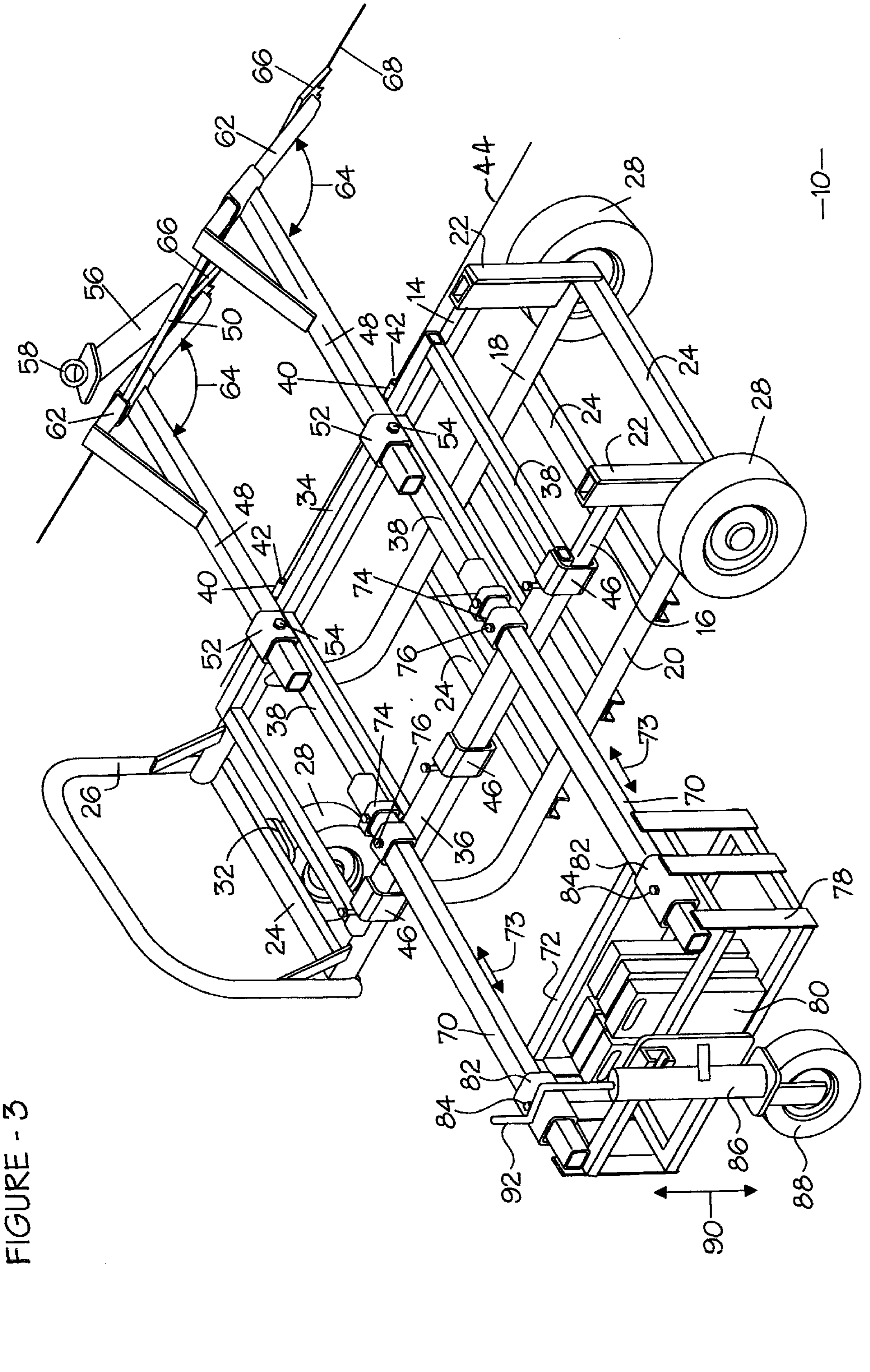
FIG. 3 is another perspective view of the assembly of FIGS. 1 and 2, taken from the opposite side to show its roof surface engaging members in more detail.

The assembly and the cart will usually be hoisted up on to the roof surface unassembled. The assembly base frame is laid on the cart frame and fastened thereto by the clamps 46. It will usually be preferred to first mount the counterweight sub-frame on the assembly base frame by inserting the support arms 70 into the sleeves 74 and tightening the clamp bolts 76, and then mounting the basket 78 on the support arm members and tightening the clamp bolts 84. The jack 86 will usually be contracted while the appropriate number of weights 80 are placed in the basket, so that the cart frame will tend to be tilted anti-clockwise as seen in FIG. 1, lifting its first side and thus making it easier to insert the support arm members 48 into their respective sleeves 52 with the teeth of the plate members 66 well clear of the surface. The support arms 48 of the surface engaging and attachment member carrying sub-frame are inserted in the sleeves 52, the hinge pins 42 are inserted in the hinges 40, and the clamp bolts 54 are tightened. In this condition the cart and assembly combination can easily be wheeled over the roof surface 10 into the position required to start the operation, namely with its first side parallel to and spaced the required distance from the roof edge 12. The jack is now extended to lift the counterweight and the second sides of the cart and assembly frames, rotating the cart frame clockwise as seen in FIG. 1 and lowering the attachment member sub-frame until the teeth on the plates 66 are in close proximity to the surface, e.g. just touching or even in engagement with it. The fall arrest tether lines 60 of appropriate length are attached to the ring bolt 58. If now any of the workers falls from the roof the safety harness tether line 60 applies a tension force to the attachment member eye bolt in the direction taken by the tether line, as indicated by the arrow 96 in FIG. 1. The eye bolt 58 is disposed a sufficient height above the roof surface that this tension force must produce a downward acting component on the members 62, as indicated by the arrow 96*a*, sufficient to tilt at least the support arms 48 downward, and perhaps also the base and cart frames, to positively engage the teeth at the lower edges of the plate members 66 with the roof surface, or even more positively if they are already engaged, whereupon the arm members 62 constitute pivot arms and the thus engaged lower ends thereof become pivots with a common pivot axis along the line 68, about which axis the base and cart frames are urged to rotate in the direction of the arrows 97 (clockwise in FIG. 1), correspondingly urging the counterweight structure upward away from the surface against its downward acting moment, which of course is adequate to prevent anything other than a small movement of the wheel 88 up away from the surface. The likelihood that the teeth will dig into the roof surface and establish the pivot axis is assisted by the small amount of pivoting that the support arms 48 can make about the hinge axis 44, such pivoting being permitted by the relatively sloppy fit of the arms 48 in the sleeves 52. The force on the eye bolt 58 also has a horizontal component, indicated by the arrow 96*b*, which will tend to drag the assembly toward the roof edge, but again the engagement of the toothed roof engaging members with the surface will be adequate to prevent anything other than a small inconsequential amount of such movement. It may be noted that, even if the worker falling from the roof is working ahead or behind the cart, as the fall arrest tether line tightens under his/her weight the resultant force is still mainly in the direction of the arrows 96 and becomes centered between the two surface engaging members 62, since as the line tightens the worker swings along the wall and the line slides along the roof edge 12 until the line is at a right angle to the edge.

The principal function of the cart is to facilitate movement of the assembly over the roof and it is possible to use the attachment assembly by itself with the roof engaging members and the counterweight basket resting on the roof surface, the assembly still functioning as a safe anchor for the safety harness tether line or lines. Meanwhile the cart can be used for its usual function. With such an arrangement a wheeled jack 86 is not required, although its inclusion will facilitate movement of the assembly over the surface and may remove the need for the basket to be unloaded between each move. In the absence of the cart to support the assembly the teeth will always contact the surface, but any indentations thus produced will be relatively shallow and can easily be repaired. The indentations produced if a worker does fall are likely to be much deeper, but again are easily repaired on the spot by the roofer, since this is well within the expected skill.

Figure 4:
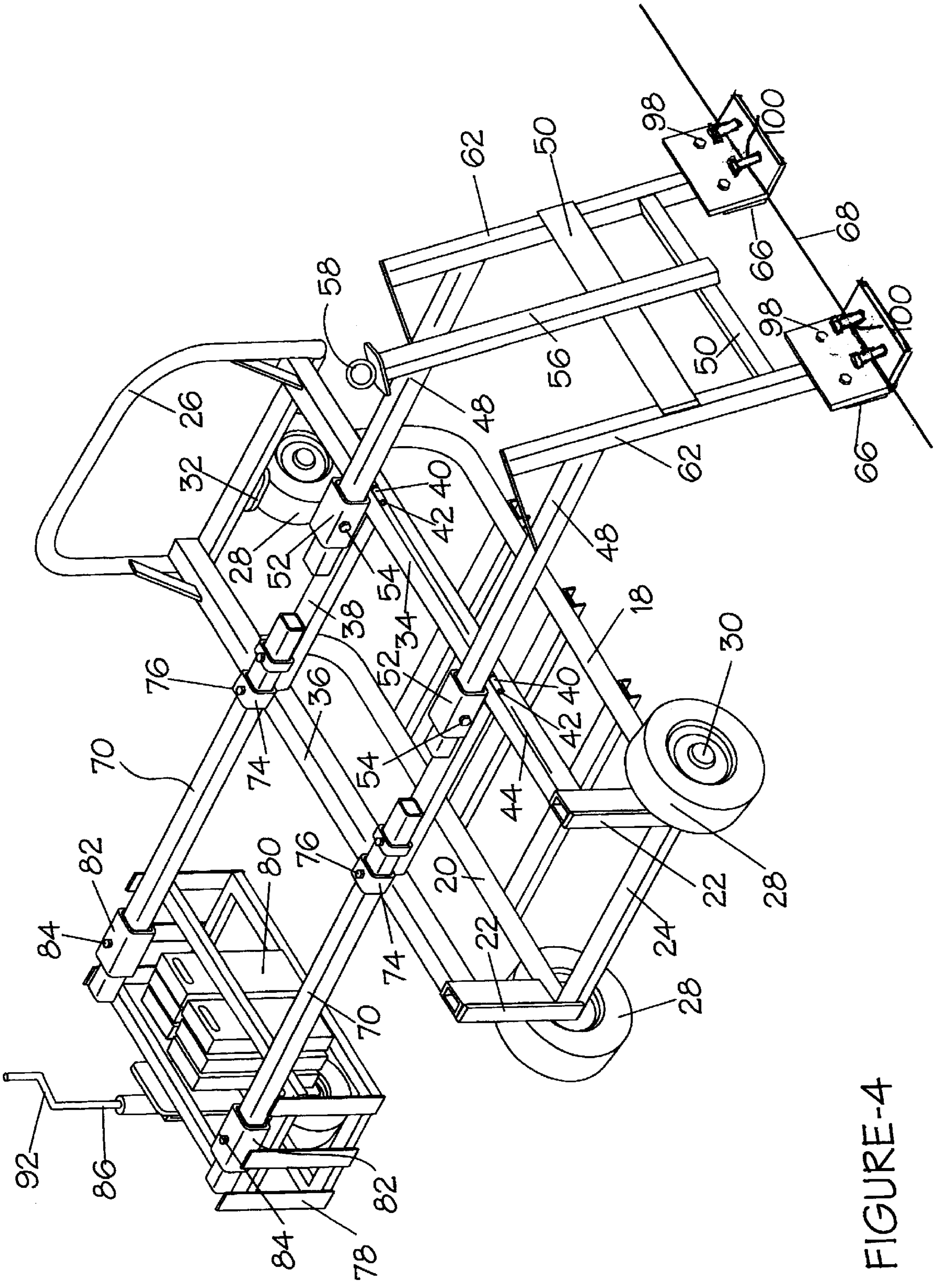
FIG. 4 is a perspective view similar to FIG. 2 to show a another embodiment in which the assembly frame is an integral part of the cart frame, and also to show a modification of the surface engaging members required for some surfaces.

Some surfaces 10, such as those made of concrete, may be too hard for the toothed plates 66 to be used, since they cannot dig in sufficiently securely to establish the pivot axis and instead the cart and assembly would be dragged toward the roof edge. With such surfaces the toothed plates 66 can be covered with smooth edged plates 98, as shown in FIG. 4, and instead the necessary sideways retention and establishment of the pivot axis 68 at the ends of the pivot arm members 62 is obtained by driving retaining bolts 100, such as HILTI (Trade Mark) bolts, into the roof surface against which the plates 98 are dragged by the outward and downward acting force. Such bolts are commonly used by roofers and usually it will not be necessary to remove them when the work is finished.

Preferably, the attachment point established by the eye bolt 58 is located as low as possible on the pivot arm member and attachment member sub-frame, since any increase in height above the required minimum increases the moment produced by the tether line, and effectively reduces the moment provided by the counterweight so that more weight must be used; a lower limit is placed on the required height when the downward acting force component establishing the pivot axis on line 68 and urge to rotate is insufficient, the force then having an undesirably large horizontal component tending to drag the assembly toward the roof edge.

FIG. 4 shows an embodiment in which the assembly and cart frames are no longer separate and connected to one another, but instead are in common with one another. Thus, the sleeves 52 receiving the support arm members 48 of the surface engaging members 62 are fastened directly to respective cart cross members 38, and similarly the sleeves 74 receiving support arms 70 of the counterweight are fastened directly to respective cross members 38. Roofers whose jobs are heavily concerned with flat roofs to which the invention is applicable may prefer such a cart, since it will be easier and faster to set up and there is less possibility that it will be taken out of service if the roofers find they are short of a cart for general use.

In a preferred embodiment intended to be operative with up to three fall arrest tether lines, and employing a cart of the dimensions given above, the attachment member sub-frame arm members 48 and the counterweight sub-frame arm members 70 are both about 1 meter (36 ins) in length. The weights 80 employed in testing it were standard weights that are used by roofers, for example, to anchor the hoist when one is used, and weighed 27.3 Kg (60 lbs) each. With such an embodiment the amount of weight required in the counterweight for two persons to be secured was only 164 Kg (360 lbs), and it is believed that this should be the minimum weight employed, even if only a single fall arrest line is to be attached to the assembly. The amount of weight required for three persons was found to be only 191 Kg (420 lbs). In making the tests using dead weights dropped from a simulated roof surface it was found that no lifting of the jack wheel 88 was observed, although the tire of the wheel may have rounded somewhat as it was unloaded by the clockwise moment; the cart and assembly did skid sideways toward the roof edge 12 by about 12.5 cm (5 ins) which is believed to quite acceptable when the combination is usually spaced a minimum of about 5 meters (15 feet) from the edge. It may be noted that the hinges 40 with their removable hinge pins 42 not only facilitate the establishment of the pivot axis at the roof surface at the ends of the pivot arm members 62, but also provide a more secure method of mounting the support arms 48 in the sleeves 52 against the dragging force which would require shearing of the pins for the arms to escape from the sleeves. Any skidding can easily be reduced to an acceptable amount by adding weight to the basket, or can be prevented entirely by driving spikes or bolts into the roof against the toothed plates 66 or against smooth edged plates 98 if they are installed.

I claim:

1. An attachment assembly for use on a horizontal surface, the assembly when mounted on such a surface providing an attachment point above the surface, the attachment assembly comprising:

- an assembly base frame having a first side which in operation faces toward a surface edge, and a second opposite side facing away from that surface edge;
- at least two surface engaging members mounted on the base frame at or adjacent to the first side and spaced longitudinally from one another along that first side, each surface engaging member having an upper and a lower end and each being attached to the base frame so that when the assembly is in position on a surface the respective lower end is in an operative position contacting or in close proximity to the surface between the first side and the surface edge; and
- an attachment member carried by the base frame and providing an attachment point between the at least two surface engaging members;
- a counterweight providing a counterweight moment and mounted on the assembly base frame so as to be disposed at the base frame second side;
- whereby the application of a tension force to the attachment member in a direction having a component toward the surface edge urges the base frame to tilt toward the first side and thereby positively engage the surface engaging members lower ends with the surface, whereupon the thus engaged lower ends become pivots about which the base frame is urged by the tension force to pivot and thereby urge the counterweight upward away from the surface against its downward acting counterweight moment.

2. An assembly as claimed in claim 1, wherein each surface engaging member consists of a support arm extending outward from the base frame first side toward the roof edge, and a surface engaging arm extending outward and downward from its support arm toward the roof edge, each support arm and its respective surface engaging arm subtending an obtuse angle toward the surface.

3. An assembly as claimed in claim 1, wherein the base frame and the surface engaging member support arms are connected by hinge means having respective first parts attached to the base frame and second parts attached to the support arms, each first and second hinge part together establishing a respective hinge axis parallel to the base frame first side so as to permit tilting of the support arms about the hinge axis to move the surface engaging members toward the surface.

4. An assembly as claimed in claim 1, wherein a surface engaging member sub-frame attachable to and detachable from the base frame as a unit comprises two surface engaging members connected together by at least one transverse cross member, and an upward extending mast providing the attachment point mounted on at least one of the transverse cross members so as to be disposed between the assembly first side and the roof edge.

5. An assembly as claimed in claim 1, wherein the lower end of each surface engaging member is provided with teeth for more positive engagement with the surface as the member is tilted toward the surface, and there is provided a removable shield plate mountable on a respective surface engaging member lower end and preventing engagement of the teeth with the surface when mounted on the lower end, retention of the surface engaging lower end to ensure tilting of the assembly base frame then being provided by retention members fastened to the surface between the surface engaging lower end and the roof edge and engaged by the shield plate.

6. An assembly as claimed in claim 1, wherein the counterweight comprises two longitudinally spaced counterweight arm members each having an inner and an outer end and extending from the base frame second side parallel to one another, mounting means on the base frame engaging the arm member inner ends to mount and guide the arm members for movement transversely of the base frame toward and away from the base frame second side, and a weight mounted at the outer ends of the arm members, the weight being thereby movable with the arms toward and away from the base frame second side to decrease and increase respectively the counterweight moment provided by the weight.

7. An assembly as claimed in claim 1, wherein the counterweight is provided with an extensible and contractible jack having a vertically movable jack member which has a lower end engageable with the surface, the jack being extensible by an operator to lift the base frame second side and thereby bring the lower ends of the surface engaging members into operative position in which they contact the surface, or are in close proximity thereto, and contractible by the operator to completely disengage the lower ends of the surface engaging members from the surface to facilitate movement of the assembly over the surface.

8. An assembly as claimed in claim 7, wherein the jack lower end is provided with a rotatably mounted wheel that engages the surface to facilitate the movement of the assembly over the surface.

9. An attachment assembly for use on a horizontal surface, the assembly being adapted for attachment to a wheeled utility cart movable over the horizontal surface, the cart having a cart frame which has a first side thereof which in operation faces toward a surface edge, and a second opposite side facing away from that surface edge, and the assembly when so attached to the cart providing an attachment point on the surface, the attachment assembly comprising:

a base frame adapted for attachment to the cart frame and also having a first side thereof which in operation faces toward the surface edge, and a second opposite side facing away from that surface edge, the base frame being attachable to the cart frame so that their first edges and their second edges respectively are adjacent to one another;

at least two surface engaging members mounted on the base frame at or adjacent to its first side and spaced longitudinally from one another along the base frame first side, each surface engaging member having an upper and a lower end and each being attached to the base frame so that when the assembly is in position on a surface the respective lower end is in an operative position contacting or in close proximity to the surface between the base and cart frame first sides and the surface edge;

an attachment member carried by the base frame and providing an attachment point between the at least two surface engaging members; and a counterweight structure providing a counterweight moment and mounted on the assembly base frame so as to be disposed at the base and cart frames second sides;

whereby the application of a tension force to the attachment member in a direction having a component toward the surface edge urges the base and cart frames to tilt toward their first sides and thereby positively engage the surface engaging members lower ends with the surface, whereupon the thus engaged lower ends become pivots about which the base and cart frames are urged by the tension force to pivot and thereby urge the counterweight upward away from the surface against its downward acting counterweight moment.

10. An assembly as claimed in claim 9, wherein each surface engaging member consists of a support arm extending outward from the base frame first side toward the roof edge and a surface engaging pivot arm extending outward and downward from its support arm toward the roof edge, each support arm and its respective surface engaging pivot arm subtending an obtuse angle toward the surface.

11. An assembly as claimed in claim 9, wherein the base frame and the surface engaging member support arms are connected by hinge means having respective first parts attached to the base frame and second parts attached to the support arms, each first and second hinge part together establishing a respective hinge axis parallel to the base frame first side so as to permit tilting of the support arms about the hinge axis to move the surface engaging members toward the surface.

12. An assembly as claimed in claim 9, wherein a surface engaging member sub-frame attachable to and detachable from the base frame as a unit comprises two surface engaging members connected together by at least one transverse cross member, and an upward extending mast providing the attachment point mounted on at least one of the transverse cross members so as to be disposed between the assembly first side and the roof edge.

13. An assembly as claimed in claim 9, wherein the lower end of each surface engaging arm is provided with teeth for more positive engagement with the surface as the arm is tilted toward the surface, and there is provided a removable shield plate mountable on the lower end and preventing engagement of the teeth with the surface when mounted on the lower end, retention of the surface engaging lower end to ensure tilting of the assembly base frame being provided by retention members fastened to the surface between the surface engaging lower end and the roof edge and engaged by the shield plate.

14. An assembly as claimed in claim 9, wherein the counterweight comprises two longitudinally spaced counterweight arm members each having an inner and an outer end and extending from the base frame second side parallel to one another, mounting means on the base frame engaging the arm member inner ends to mount and guide the arm members for movement transversely of the base frame toward and away from the base frame second side, and a weight mounted at the outer ends of the arm members, the weight being thereby movable with the arms toward and away from the base frame second side to decrease and increase respectively the counterweight moment provided by the weight.

15. An assembly as claimed in claim 9, wherein the counterweight is provided with an extensible and contractible jack having a vertically movable jack member which has a lower end engageable with the surface, the jack being extensible by an operator to lift the base frame second side and thereby bring the lower ends of the surface engaging members into operative position in which they contact the surface, or are in close proximity thereto, and contractible by the operator to completely disengage the lower ends of the surface engaging members from the surface to facilitate movement of the assembly over the surface.

16. An assembly as claimed in claim 15, wherein the jack lower end is provided with a rotatably mounted wheel that engages the surface to facilitate the movement of the assembly over the surface.

17. An attachment assembly and wheeled utility cart combination for use on a horizontal surface and adapted for movement over the surface, the combination having a base frame which in operation has a first side which faces toward a surface edge, and a second opposite side facing away from that surface edge, the base frame providing an attachment point on the surface, the combination comprising:

at least three wheels rotatably mounted by the base frame and on which the combination is movable over the surface;

at least two surface engaging members mounted on the base frame at or adjacent to its first side and spaced longitudinally from one another along the base frame first side, each surface engaging member having an upper and a lower end and each being attached to the base frame so that when the assembly is in position on a surface the respective lower end is in an operative position contacting or in close proximity to the surface between the base frame first side and the surface edge;

an attachment member carried by the base frame and providing an attachment point between the at least two surface engaging members; and a counterweight structure providing a counterweight moment and mounted on the base frame so as to be disposed at the base frame second side;

whereby the application of a tension force to the attachment member in a direction having a component toward the surface edge urges the base frame to tilt toward its first side and thereby positively engage the surface engaging members lower ends with the surface, whereupon the thus engaged lower ends become pivots about which the base frame is urged by the tension force to pivot and thereby urge the counterweight upward away from the surface against its downward acting counterweight moment.

18. A combination as claimed in claim 17, wherein each surface engaging member consists of a support arm extending outward from the base frame first side toward the roof edge and a surface engaging arm extending outward and downward from its support arm toward the roof edge, each support arm and its respective surface engaging arm subtending an obtuse angle toward the surface.

19. A combination as claimed in claim 17, wherein the base frame and the surface engaging member support arms are connected by hinge means having respective first parts attached to the base frame and second parts attached to the support arms, each first and second hinge part together establishing a respective hinge axis parallel to the base frame first side so as to permit tilting of the support arms about the hinge axis to move the surface engaging members toward the surface.

20. A combination as claimed in claim 17, wherein a surface engaging member sub-frame attachable to and detachable from the base frame as a unit comprises two surface engaging members connected together by at least one transverse cross member, and an upward extending mast providing the attachment point mounted on at least one of the transverse cross members so as to be disposed between the combination first side and the roof edge.

21. A combination as claimed in claim 17, wherein the lower end of each surface engaging member is provided with teeth for more positive engagement with the surface as the member is tilted toward the surface, and there is provided a removable shield plate mountable on the member lower end preventing engagement of the teeth with the surface when mounted on the lower end, retention of the surface engaging lower end to ensure tilting of the combination base frame then being provided by retention members fastened to the surface between the surface engaging lower end and the roof edge and engaged by the shield plate.

22. A combination as claimed in claim 17, wherein the counterweight comprises two longitudinally spaced counterweight arm members each having an inner and an outer end and extending from the base frame second side parallel to one another, mounting means on the base frame engaging the arm member inner ends to mount and guide the arm members for movement transversely of the base frame toward and away from the base frame second side, and a weight mounted at the outer ends of the arm members, the weight being thereby movable with the arms toward and away from the base frame second side to decrease and increase respectively the counterweight moment provided by the weight.

23. A combination as claimed in claim 17, wherein the counterweight is provided with an extensible and contractible jack having a vertically movable jack member which has a lower end engageable with the surface, the jack being extensible by an operator to lift the base frame second side and thereby bring the lower ends of the surface engaging members into operative position in which they contact the surface, or are in close proximity thereto, and contractible by the operator to completely disengage the lower ends of the surface engaging members from the surface to facilitate movement of the combination over the surface.

24. A combination as claimed in claim 23, wherein the jack lower end is provided with a rotatably mounted wheel that engages the surface to facilitate the movement of the combination over the surface.

* * * * *